United States Patent [19]

Yamaguchi et al.

[11] Patent Number: 4,972,433
[45] Date of Patent: Nov. 20, 1990

[54] RECEIVER CAPABLE OF IMPROVING SIGNAL-TO-NOISE RATIO IN REPRODUCING DIGITAL SIGNAL

[75] Inventors: Masaru Yamaguchi; Masanobu Arai, both of Tokyo; Takenori Ogata, Miyagi, all of Japan

[73] Assignee: NEC Corporation, Tokyo, Japan

[21] Appl. No.: 249,068

[22] Filed: Sep. 26, 1988

[30] Foreign Application Priority Data

Sep. 25, 1987 [JP] Japan .............................. 62-238990

[51] Int. Cl.$^5$ ............................................. H03H 7/30
[52] U.S. Cl. ...................................... 375/12; 375/14; 333/18
[58] Field of Search ..................................... 375/11–13, 375/103, 14; 333/18

[56] References Cited

U.S. PATENT DOCUMENTS

| | | | |
|---|---|---|---|
| 3,708,766 | 1/1973 | Sha et al. ................................. | 333/18 |
| 3,795,865 | 3/1974 | Armstrong ............................. | 333/18 |
| 4,359,778 | 11/1982 | Lee ......................................... | 333/18 |

Primary Examiner—Douglas W. Olms
Assistant Examiner—Marianne Huseman
Attorney, Agent, or Firm—Sughrue, Mion, Zinn, Macpeak & Seas

[57] ABSTRACT

In a receiver comprising a filter section for filtering a transmitted digital signal into a filtered digital signal and an equalizer section for equalizing the filtered digital signal into an equalized digital signal as a reproduced digital signal in response to controllable tap gains supplied from a control arrangement, the equalizer section comprises a first arrangement for filtering the filtered digital signal in response to predetermined ones of the controllable tap gains to produce an intermediate digital signal and a second arrangement for equalizing the intermediate digital signal into the equalized digital signal in response to remaining ones of the controllable tap gains except for the predetermined controllable tap gains to produce the reproduced digital signal. The control arrangement controls the predetermined tap gains so as to minimize noise power of a noise signal accompanying the filtered digital signal and the remaining controllable tap gains and to equalize the intermediate digital signal into the equalized digital signal.

2 Claims, 2 Drawing Sheets

RECEIVER CAPABLE OF IMPROVING SIGNAL-TO-NOISE RATIO IN REPRODUCING DIGITAL SIGNAL

BACKGROUND OF THE INVENTION

This invention relates to a receiver for receiving a digital signal transmitted through a transmission path to reproduce the transmitted digital signal as a reproduced digital signal.

A receiver of the type described is supplied with a transmitted digital signal which is transmitted through a transmission path of a first frequency characteristic and which is inevitably subjected to noise. It is therefore necessary in the receiver not only to equalize the transmitted digital signal but also to remove the noise. To this end, the receiver comprises a feedback digital filter for equalizing the transmitted digital signal. In addition, a proposal is made about reduction of the noise by using a matched filter which has an infinite delay time. However, it is practically difficult to implement such a matched filter having the infinite delaying time.

In order to practically reduce the noise, an improved receiver is disclosed in an article contributed by J. Salz to The Bell System Technical Journal Vol. 52, No. 8 (October 1973), pages 1341 to 1373, under the title of "Optimum Mean-Square Decision Feedback Equalization". The improved receiver comprises a linear filter and the feedback digital filter. The linear filter is used as a filter section and has a second frequency characteristic. The feedback digital filter is used as an equalizer section. The linear filter filters the transmitted digital signal into a filtered digital signal. The feedback decision equalizer equalizes the filtered digital signal into an equalized digital signal in response to controllable tap gains. The controllable tap gains are controlled by a tap gain controller in accordance with the first and second frequency characteristics to make the linear filter produce the equalized digital signal as the reproduced digital signal.

However, the linear filter can not sufficiently get rid of the noise introduced into the transmitted digital signal. Additionally, the filtered digital signal is accompanied with a noise signal and is applied to the feedback digital filter together with the noise signal. The equalized digital signal is produced with the noise from the feedback decision equalizer. This makes it difficult to achieve a satisfactory signal-to-noise ratio in the reproduced digital signal.

SUMMARY OF THE INVENTION

It is an object of this invention to provide a receiver capable of receiving a digital signal transmitted through a transmission path to reproduce the transmitted digital signal as a reproduced digital signal with a satisfactory signal-to-noise ratio.

Other objects of this invention will become clear as the description proceeds.

A receiver to which this invention is applicable is for receiving a digital signal transmitted through a transmission path of a first frequency characteristic to reproduce the transmitted digital signal as a reproduced digital signal and comprises a filter section having a second frequency characteristic for filtering the transmitted digital signal into a filtered digital signal, an equalizer section for equalizing the filtered digital signal into an equalized digital signal in response to controllable tap gains, and control means for controlling the controllable tap gains in accordance with the first and the second frequency characteristics to make the equalizer section produce the equalized digital signal as the reproduced digital signal. According to this invention, the equalizer section comprises first means for filtering the filtered digital signal in response to predetermined ones of the controllable tap gains to produce an intermediate digital signal and second means for equalizing the intermediate digital signal into the equalized digital signal in response to remaining ones of the controllable tap gains to produce the reproduced digital signal.

DESCRIPTION OF THE PREFERRED EMBODIMENT

Figure 1:
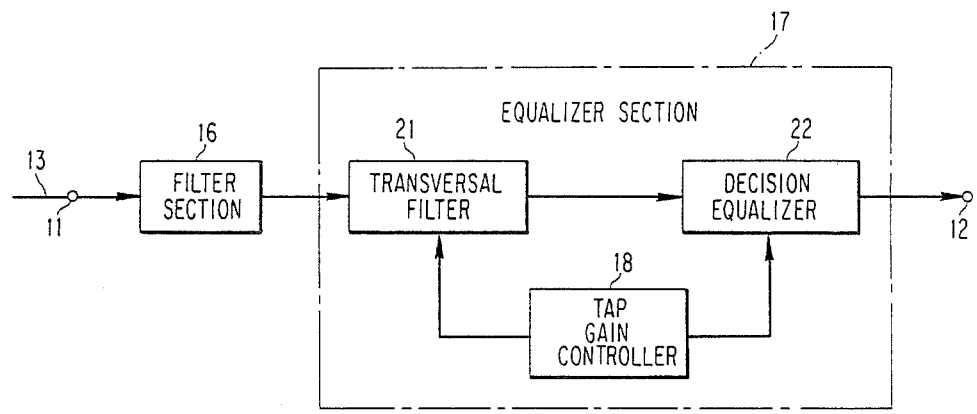
FIG. 1 shows a block diagram of a receiver according to an embodiment of this invention.

Referring to FIG. 1, a receiver has receiver input and output terminals 11 and 12. Through a transmission path 13 which may be a radio channel, a transmitted digital signal is supplied to the receiver input terminal 11 as a received digital signal. The transmitted digital signal may be, for example, a binary signal. The transmitted digital signal is carried by a carrier signal of a carrier angular frequency $\omega$ and is transmitted at a predetermined transmission rate R. The transmission path 13 has a first frequency characteristic $T(\omega)$. The first frequency characteristic $T(\omega)$ represents a transfer function of the transmission path 13. The transfer function of the transmission path 13 is represented as a frequency response in accordance with the carrier angular frequency. The received digital signal is inevitably accompanied by noise to which the transmitted digital signal is subjected while being transmitted through the transmission path 13.

According to a preferred embodiment of the present invention, the receiver comprises a filter section 16 connected to the receiver input terminal 11. The filter section 16 filters the received digital signal into a filtered digital signal in accordance with a second frequency characteristic $H(\omega)$. The second frequency characteristic $H(\omega)$ represents a transfer of the filter section 16. The transfer function of the filter section 16 is represented as a frequency response in accordance with the carrier angular frequency. Due to the noise accompanying the received digital signal, the filtered digital signal is accompanied by a noise signal.

An equalizer section 17 is given a plurality of controllable tap gains in the manner which is known in the art and will become clear as the description proceeds. The equalizer section 17 equalizes the filtered digital signal into an equalized digital signal in response to the controllable tap gains and delivers the equalized digital signal to the receiver output terminal 12 as a reproduced digital signal which is a reproduction of the transmitted digital signal exempted substantially from the noise.

In the manner which will presently be described, the equalizer section 17 includes a tap gain controller 18 which keeps the first and the second frequency characteristics. The controllable tap gains are controlled by the tap gain controller 18 in accordance with the first and the second frequency characteristics. According to this invention, the controllable tap gains are classified into predetermined tap gains and remaining tap gains.

The equalizer section 17 comprises a transversal filter 21 and a decision equalizer 22. The filtered digital signal is supplied to the transversal filter 21 from the filter section 16. The transversal filter 21 filters the filtered digital signal into an intermediate digital signal in response to the predetermined tap gains. In this manner, the transversal filter 21 is operable as a first arrangement. The decision equalizer 22 is supplied with the intermediate digital signal and equalizes the intermediate digital signal into the equalized digital signal in response to the remaining tap gains. The equalized digital signal is delivered to the receiver output terminal 12 as the reproduced digital signal. The decision equalizer 22 is operable as a second arrangement.

Figure 2:
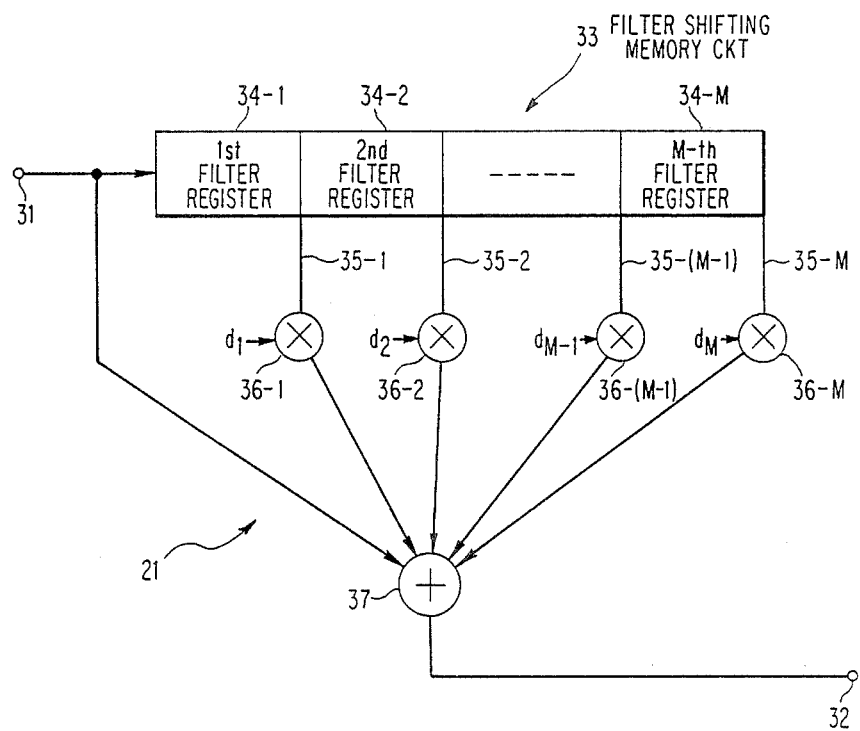
FIG. 2 shows a block diagram of a transversal filter used in the receiver illustrated in FIG. 1.

Referring to FIG. 2, the transversal filter 21 has filter input and output terminals 31 and 32. The filtered digital signal is supplied to the filter input terminal 31. The transversal filter 21 comprises a filter shifting memory circuit 33 having first through M-th filter registers 34-1, 34-2, . . . , and 34-M connected in cascade, where M may be, for example, six. The filter shifting memory circuit 33 has first through M-th transversal filter taps 35-1, 35-2, . . . , 35-(M−1), and 35-M corresponding to the filter registers 34-1 to 34-M, respectively. The input terminal 31 corresponds to a zeroth tap. Transversal filter taps 35-1 to 35-M are connected to first through M-th filter multipliers 36-1, 36-2, . . . , 36-(M−1), and 36-M. The tap gain controller 18 (FIG. 1) supplies first through M-th predetermined tap gains $d_1$ to $d_M$ to the first through the M-th filter multipliers 36-1 to 36-M. The filter multipliers 36-1 to 36-M are connected to a filter adder 37. The filter adder 37 is connected to the decision equalizer 22 (FIG. 1) through the filter output terminal 32.

The filtered digital signal is supplied to the first register 34-1 and the adder 37 through the filter input terminal 31. Each of the first through the M-th filter registers gives a delay of 1/R to a signal supplied thereto. The first through the M-th registers 34-1 to 34-M supply first through M-th delayed digital signals to the first through the M-th multipliers 36-1 to 36-M through the first through the M-th transversal filter taps 35-1 to 35-M, respectively.

The first multipliers 36-1 multiplies the first delayed digital signal by the first predetermined tap gain $d_1$. The first through the M-th multipliers 36-1 to 36-M deliver first through M-th multiplied digital signals, respectively, to the adder 37. The adder 37 calculates a total sum of the filtered digital signal and the first through the M-th multiplied digital signals to produce a sum digital signal as the intermediate digital signal. The sum digital signal is delivered to the decision equalizer 17 through the filter output terminal 22. The sum digital signal is produced in the form of a binary signal.

Figure 3:
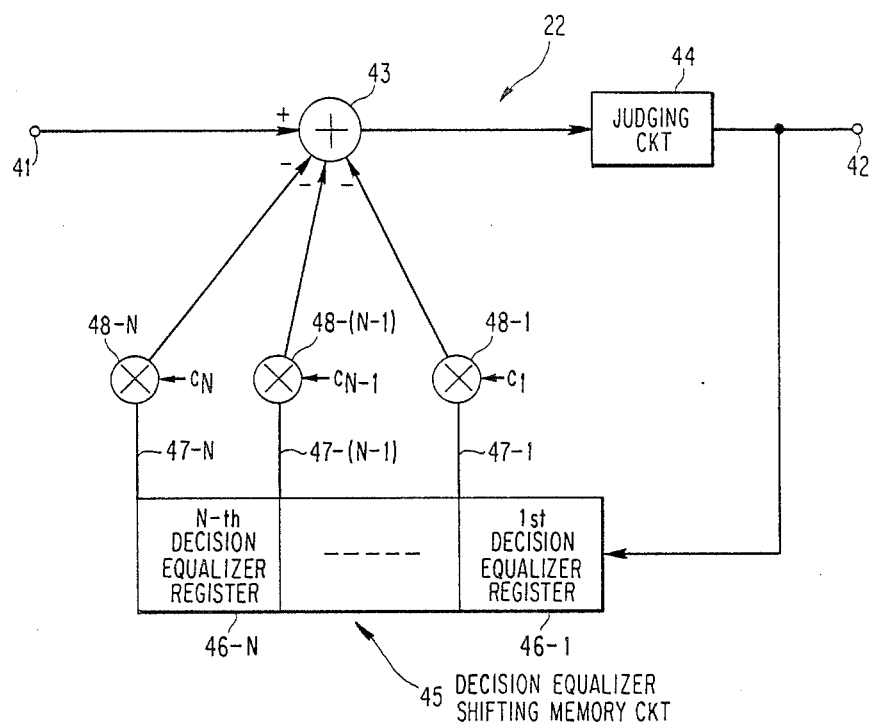
FIG. 3 shows a block diagram of a feedback decision equalizer used in the receiver illustrated in FIG. 1.

Referring to FIG. 3, the decision equalizer 22 has equalizer input and output terminals 41 and 42. The sum digital signal is supplied to the equalizer input terminal 41 from the transversal filter 21 (FIG. 1). The decision equalizer 22 comprises a decision equalizer adder 43 and a judging circuit 44 connected to the decision equalizer adder 43. The judging circuit 43 is connected to a decision equalizer shifting memory circuit 45 having first through N-th decision equalizer registers 46-1, 46-2, . . . , and 46-N connected in cascade, where N may be, for example, fifteen. The decision equalizer shifting memory circuit 44 has first through N-th decision equalizer taps 47-1, 47-2, . . . , and 47-N corresponding to the decision equalizer registers 46-1 to 46-N, respectively. Each of decision equalizer taps 47-1 to 47-N is connected to first through N-th decision equalizer multipliers 48-1, 48-2, . . . , and 48-N. The tap gain controller 18 (FIG. 1) supplies first through N-th remaining tap gains $c_1$ to $c_N$ to the first through the N-th decision equalizer multipliers 48-1 to 48-N. The decision equalizer multipliers 48-1 to 48-N are connected to the decision equalizer adder 43.

The sum digital signal is supplied to the judging circuit 44 through the decision equalizer adder 43. The judging circuit 44 has a predetermined threshold level. The judging circuit 44 judges at first the sum digital signal whether or not the sum digital signal has a binary level above the predetermined threshold level to decide a judged binary level for the binary level. The judging circuit 44 thereby produces a judged digital signal having the judged binary level. The judging circuit 44 delivers the judged digital signal to the first decision equalizer register 46-1. The first through the N-th decision equalizer registers 46-1 to 46-M supply first through the N-th decision equalizer delayed digital signal to the first through the N-th decision equalizer multipliers 48-1 to 48-N through the first through the N-th decision equalizer taps 47-1 to 47-N, respectively. Each of the decision equalizer registers 46-1 to 46-M gives a delay of 1/R to an input signal supplied thereto.

The first decision equalizer multiplier 48-1 multiplies the first decision equalizer delayed digital signal by the first remaining tap gain $c_1$. The first through the N-th decision equalizer multipliers 48-1 to 48-N deliver first through N-th decision equalizer multiplied digital signals, respectively, to the decision equalizer adder 43. The decision equalizer adder 43 substracts a sum of the first through the N-th decision equalizer multiplied digital signals from the sum digital signal to produce a substracted digital signal. The subtracted digital signal is produced in the form of a binary signal. The subtracted digital signal is supplied to the judging circuit 44 and is judged by the judging circuit 43 to be produced as the reproduced digital signal. The reproduced digital signal is delivered from the equalizer output terminal 42 to the receiver output terminal 12.

Figure 4:
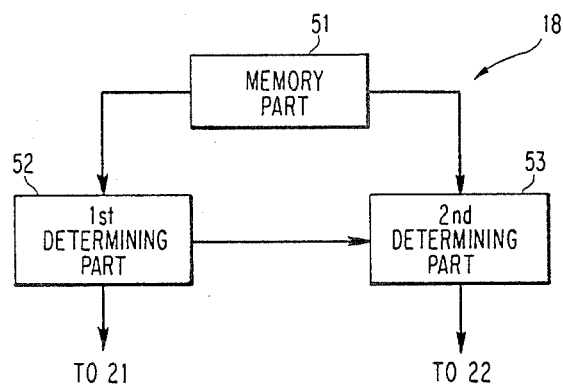
FIG. 4 shows a block diagram of a tap gain controller used in the receiver illustrated in FIG. 1.

Referring to FIG. 4, the tap gain controller 18 comprises a memory part 51 such as a read only memory (ROM), a first determining part 52, and a second determining part 53. The memory part 51 memorizes the first and the second frequency characteristics and a noise spectrum $N(\omega)$ of the noise signal accompanying the filtered digital signal. The first and second frequency characteristics and the noise spectrum can be loaded into the memory using any well-known method. For example, the first and the second frequency characteristics $T(\omega)$ and $H(\omega)$ can be measured at the transmission path 13 and the filter section 16, respectively. A noise spectrum $N(\omega)$ can be measured in the noise signal accompanying the filtered digital signal. When the memory part 51 is manufactured, the first and the second frequency characteristics $T(\omega)$ and $H(\omega)$ and the noise spectrum $N(\omega)$ are memorized in the memory part 51. The first determining part 52 determines the first through the M-th predetermined tap gains $d_1$ to $d_M$ in response to the second frequency characteristic $H(\omega)$ and the noise spectrum $N(\omega)$. The first determining part 52 supplies the first through the M-th predetermined tap gains $d_1$ to $d_M$ to the first and the M-th filter multipliers 36-1 to 36-M and to the second determining part 53. The second determining part 53 determines the first through the N-th remaining tap gains $c_1$ to $c_N$ in response to the first and the second frequency characteristics $T(\omega)$ and $H(\omega)$ and the first through the M-th predetermined tap gains $d_1$ to $d_M$ supplied from the first determining part 52. The second determining part 53 supplies the first through the N-th remaining tap gains $c_1$ to $c_N$ to the first through the N-th decision equalizer multipliers 48-1 to 48-N, respectively.

Reviewing FIGS. 1 to 4, description will be made about controlling the first through the M-th predetermined tap gains $d_1$ to $d_M$ and the first through the N-th remaining tap gains $c_1$ to $c_N$. The transversal filter 21 has a third frequency characteristic $G(\omega)$ given as follows:

$$G(\omega) = \sum_{i=0}^{M} d(i) e^{-j\omega t(i)}, \quad (1)$$

where $d(i)$ represents the first through the M-th predetermined tap gains $d_1$ to $d_M$ and a zeroth tap gain $d_0$ which is equal to unity and where $t(i)$ represents zeroth through M-th time instants having a time duration of $1/R$ between two consecutive ones of the time instants. The zeroth time instant $t_0$ represents a time instant at which the filtered digital signal is supplied to the transversal filter 21.

The transversal filter 21 produces the intermediate digital signal which may be accompanied by a small noise signal of a noise power $\sigma^2$. The noise power is given by:

$$\sigma^2 = \int_{-\infty}^{\infty} N(\omega) \cdot |H(\omega)G(\omega)|^2 d\omega. \quad (2)$$

From Equations (1) and (2), it is seen that the noise power is represented by:

$$\sigma^2 = \int_{-\infty}^{\infty} N(\omega) \cdot |H(\omega)|^2 \left| \sum_{i=0}^{M} d(i) e^{-j\omega t(i)} \right|^2 d\omega. \quad (3)$$

It will be understood from Equation (3) that the noise power is represented as a quadratic having a positive coefficient related to the zeroth through the M-th predetermined tap gains $d_0$ to $d_M$.

Supplied with the frequency characteristic $H(\omega)$ and the noise spectrum $N(\omega)$ from the memory part 51, the first determining part 52 determines the first through the M-th predetermined tap gains $d_1$ to $d_M$ by minimizing the noise power. A microprocessor may be used as the first determining part 52. Responsive to the first through the M-th predetermined tap gains $d_1$ to $d_M$ supplied to the first through the M-th filter multipliers 35-1 to 35-M, the transversal filter 21 filters the filtered digital signal into the intermediate digital signal so as to minimize the noise power of the intermediate digital signal.

A combination of the transmission path 13, the filter section 16, and the transversal filter 21 has an impulse response $g(t)$ given as a function of time t by:

$$g(t) = \int_{-\infty}^{\infty} T(\omega)H(\omega)G(\omega)\exp(j\omega t)d\omega, \quad (4)$$

which varies from zero to unity at $t=0$ when the transversal filter 21 is supplied with the filtered digital signal. It will be assumed that the impulse response $g(t)$ has zeroth through N-th levels $g_0$ to $g_N$ at zeroth through N-th time instants, respectively, where two adjacent ones of the zeroth through the N-th time instants are spaced apart by the above-mentioned time duration $1/R$ like the first through the M-th time instants. The zeroth level $g_0$ is equal to unity.

Supplied with the first and the second frequency characteristics from the memory part 51 and with the zeroth through the M-th predetermined tap gains $d_0$ to $d_M$ from the first determining part 52, the second determining part 53 calculates the first through the N-th levels $g_1$ to $g_N$ according to Equation (4). A microprocessor may be used as the second determining part 53. The second determining part 53 thereby supplies the decision equalizer 22 with the first through the N-th levels $g_1$ to $g_N$ as the first through the N-th remaining tap gains $c_1$ to $c_N$, respectively.

With the first through the N-th remaining tap gains $c_1$ to $c_N$ supplied to the first through the N-th decision equalizer multipliers 48-1 to 48-N, the decision equalizer 22 equalizes the intermediate digital signal into the equalized digital signal.

What is claimed is:

1. In a receiver for use in receiving a digital signal transmitted through a transmission path of a first frequency characteristic to reproduce said transmitted digital signal as a reproduced digital signal, said receiver comprising a filter section having a second frequency characteristic for filtering said transmitted digital signal into a filtered digital signal in accordance with said second frequency characteristic, an equalizer section for equalizing said filtered digital signal into an equalized digital signal in response to controllable tap gains, and control means for controlling said controllable tap gains in accordance with said first and said second frequency characteristics to make said equalizer section produce said equalized digital signal as said reproduced digital signal, said filtered digital signal being accompanied by a noise signal, the improvement wherein:

said equalizer section comprises:

first means for filtering said filtered digital signal in response to predetermined ones of said controllable tap gains to produce an intermediate digital signal; and second means for equalizing said intermediate digital signal into said equalized digital signal in response to remaining ones of said controllable tap gains to produce said reproduced digital signal; and said control means comprises:

memorizing means for memorizing said first and said second frequency characteristics and a noise spectrum of said noise signal;

first determining means responsive to said second frequency characteristic and said noise spectrum for determining said predetermined tap gains so as to minimize noise power of said noise signal in said intermediate digital signal; and second determining means responsive to said first and said second frequency characteristics and said predetermined tap gains for determining said remaining tap gains so as to equalize said intermediate digital signal into said reproduced digital signal.

2. A receiver as claimed in claim 1, said intermediate digital signal being an intermediate binary signal, wherein said second means comprises a judging circuit for judging whether or not an input binary signal has a binary level above a predetermined threshold level to decide a judged binary level for said input binary level, said judging circuit thereby producing an output binary signal having said judged binary level, said second means further comprising modifying means for modifying a combination of said intermediate and said output binary signals into a modified binary signal in response to said remaining tap gains, and means for supplying said judging circuit as said input binary signal with said intermediate binary signal at first and subsequently with said modified binary signal, said judging circuit producing said output binary signal as said equalized digital signal when supplied with said modified signal.

* * * * *

UNITED STATES PATENT AND TRADEMARK OFFICE
CERTIFICATE OF CORRECTION

PATENT NO. : 4,972,433

DATED : November 20, 1990

INVENTOR(S) : Masaru YAMAGUCHI et al

It is certified that error appears in the above-identified patent and that said Letters Patent is hereby corrected as shown below:

Col. 2, line 50 after "transfer" insert --function--.

Signed and Sealed this

Twelfth Day of May, 1992

Attest:

DOUGLAS B. COMER

Attesting Officer     Acting Commissioner of Patents and Trademarks